Oct. 30, 1934.   M. J. CAFIERO   1,978,932
CABLE TAP
Filed Feb. 27, 1932
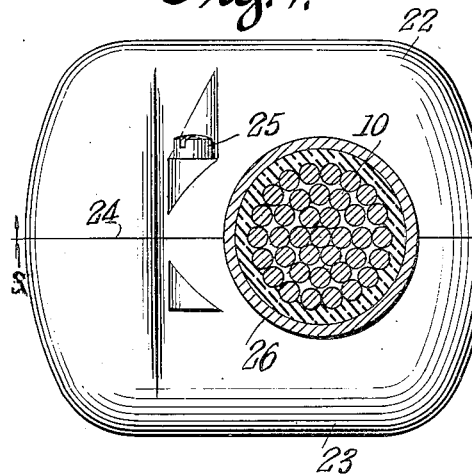
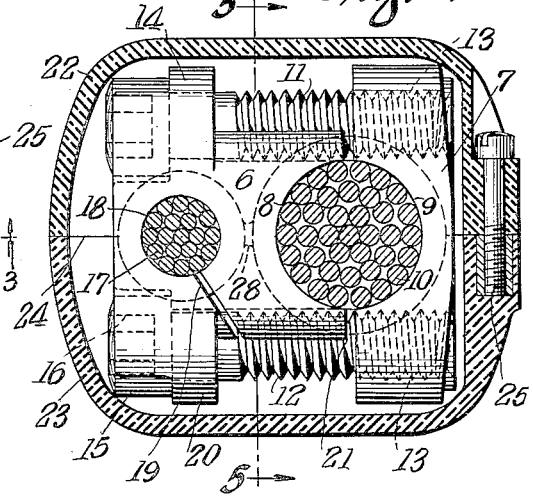
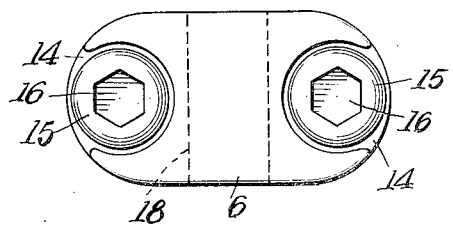
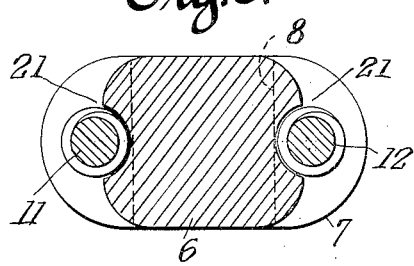
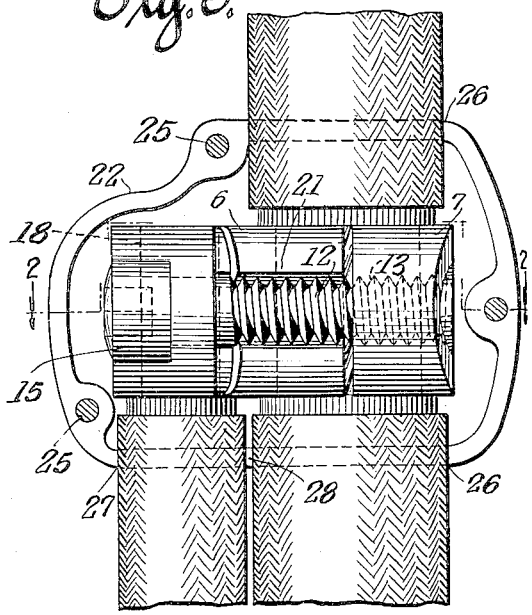
INVENTOR
Michael J. Cafiero
BY Philip S. McLean
ATTORNEY Patented Oct. 30, 1934

1,978,932

UNITED STATES PATENT OFFICE 1,978,932

CABLE TAP

Michael J. Cafiero, Brooklyn, N. Y.

Application February 27, 1932, Serial No. 595,449

6 Claims. (Cl. 173—273)

The objects of this invention are to provide a solderless cable tap by means of which branch conductors may be quickly and efficiently connected with the main conductors or cables; to provide such device in a simple, inexpensive and compact form adapted for use in restricted spaces; and to provide convenient, practical and neat insulation for the complete mechanical and electrical joint.

The foregoing and other desirable objects are attained by the novel features of construction, combinations and relations of parts hereinafter disclosed and broadly covered in the claims.

The drawing accompanying and forming part of the specification illustrates one of the practical commercial embodiments of the invention, but such illustration is primarily for purposes of disclosure and it is to be understood that the structure may be modified and changed as regards such illustration, all within the true intent and broad scope of the invention.

Fig. 1 is a plan view of the complete tap, with the insulating enclosure applied and with the cable appearing in section.

Fig. 2 is a horizontal sectional view as on substantially the plane of line 2—2 of Fig. 3.

Fig. 3 is a side elevation of the device with half of the insulating cover removed as on substantially the plane of line 3—3 of Fig. 1.

Fig. 4 is a view of the branch side of the tap.

Fig. 5 is a cross-sectional view as on line 5—5 of Fig. 2.

The body of the tap is made up of companion clamp members 6, 7, having in their opposing faces the cooperating seats 8, 9, each slightly less than semi-circular to fully grip the cable 10 when they are drawn together by the bolts 11, 12, which pass to opposite sides of the cable.

The clamp part 7 may be considered as the base or back member, since it carries the screw seats 13 for the bolts and the companion part 6 may be considered as the cap member of the clamp having the cavities or seats 14 sunk in the outer face of the same, for the heads 15 of the bolts. These bolts are shown as of the "Allen head" type, with polygonal sockets 16 in the heads of the same to receive a wrench key.

With these socketed bolt heads and the bolt heads socketed in the cap member of the clamp, a smooth contour is provided with no projecting parts. The entire clamp structure is of generally oval shape, as viewed from the end, Fig. 4, and of a length only slightly greater than the diameter of the cable, plus the diameters of the two bolts which straddle the cable.

The cap member of the clamp is socketed to receive the branch conductor and in addition, is constructed to serve as a clamp for securing that conductor.

In the form of the invention here shown, the branch conductor which is designated 17 is received in a socket 18 in the form of a hole extending entirely through the cap member parallel with the clamp passage for the main conductor and this socket is shown as slotted through to one side of the cap member at 19 to render that portion 20 of the cap beneath the head of bolt 12 springy and yieldable to grip the surrounded portion of the branch conductor. In the illustration, the slot 19 is formed on an incline with respect to the axis of the bolt 12 and on a slant extending from the branch passage 18 below or behind the bolt head seat. This construction and arrangement produces both a wrapping movement of the spring jaw portion 20 of the split clamp about the enclosed conductor and at the same time gives the desired thickness of metal at the seat beneath the bolt head without adding to the overall dimensions of the clamp structure.

To afford clearance for the intermediate portions of the bolts and to save metal and hence weight and size where metal is not actually required, the cap member is shown as open at the sides as indicated at 21. This construction has the added advantage of exposing the shanks of the bolts, so that if any weakness develops in the course of tightening the bolts, the same may be observed and a new bolt substituted before actual breakage occurs. This open-sided construction also reduces the length of the slot 19 and hence, if the slot is cut by a saw or the like, the amount of work which needs be performed on the clamp.

In using the tap, the two parts of the clamp may be lightly set up on the main cable and be so held by the bolt 11 which secures the solid side of the cap member, the other bolt 12, possibly being in place to act as a guide for the cap. The slotted or springy side of the cap clamp being then free and such spring clamp standing then in its open relation, the bared portion of the branch conductor may be readily slipped into position therein in close parallel relation to the main conductor. The second screw 12 may then be tightened to close the spring jaw on the secondary conductor and both bolts be then fully tightened to firmly set the two part clamp on the main conductor and the split clamp on the branch conductor.

From the foregoing, it may be noted that the so-called cap member of the clamp consists in fact of two relatively movable portions, that is the intermediate portion recessed to seat and grip the main conductor and the overstanding end portion held by the bolts and having movement with respect to the intermediate portion sufficient to grip the branch conductor. These two parts are in effect joined by a spring connection which yields to grip the branch conductor in an enveloping or wrapping movement. With only the two bolts, both the main and the branch conductors are gripped and these bolts can be used selectively as above described, first to grip the tap on the main cable and then to grip the branch conductor to the tap. It is to be noted also that the removal of metal from beneath the bolt head seat 14, along the bolt shank as at the top in Fig 2, leaves that seat to serve as a lever for opening up the severed spring jaw portion at the opposite side of the cap. Thus the tendency of tightening up the bolt 11 is to open up the spring jaw portion of the split clamp. Therefore, the act of first setting up the tap on the main conductor has the added effect of opening up the spring jaw clamp in readiness to receive the end of the branch conductor.

To insulate and cover the tap and complete joint, an insulating case is used consisting in the present disclosure of the two half shells 22, 23, molded in the form of a box closely fitting about the adapter and meeting on the plane 24 intercepting the centers of the main and branch conductors. These half shells are shown as secured together by screws 25 and as having at one side through passages 26 in the top and bottom of the same for the main conductor and in the bottom only a passage 27 for the branch conductor. All three of these passages are preferably of a size to closely fit and hence form companion clamping jaws gripping the insulation of the conductors and thereby firmly securing the insulating cover on the conductors independently of and apart from the tap structure. Thus these cover halves can adapt themselves to the conductor insulation without being limited in their closing movement by the body of the tap. The tap however prevents the insulating cover slipping up or down beyond certain limits if the screws 25 should come loose, or if the insulation of the conductors should shrink so as to no longer be actually gripped between the half shells of the cover.

At the top particularly, the cover is preferably entirely tight, so as to shed water from the joint, but at the bottom, a slight space may be left between the halves, at a point between the two conductors as indicated at 28, Figs. 2 and 3 for ventilation purposes and to prevent "sweating" and condensation of moisture within the casing. This slight clearance between the conductors also allows for certain variations as may occur in the insulation and relative parallelism of the two conductors.

The insulating cover is readily removable at any time to permit inspection of the joint and, if necessary, further setting up of the bolts for electrical contact and mechanical gripping purposes. While the two parts, that is, the intermediate and the end portions of the cap member are shown as yieldingly connected, by reason of the cut extending from the branch conductor passage out through one side of said member, it will be seen that such parts of the member may be entirely separated by extending an oppositely inclined cut from the other side of the passage out through the opposite side of the member. The construction thus modified is applicable for use where the branch conductor continues in opposite directions and does not terminate at the tap, enabling the clamping portions to be placed about the sides of the branch conductor after the manner in which the clamp members are placed about the sides of the main conductor. In all forms, the tap is especially compact and small in size.

What is claimed is:

1. A cable tap comprising cooperating clamp members having opposed cable receiving recesses, one of said members having screw seats at opposite sides of the recess therein, the other member having bolt head receiving sockets at opposite sides of the recess therein, said latter member having a conductor receiving socket therein between the bolt head sockets, said conductor receiving socket having an opening through one side of the same extending out through the side of said member beneath the bolt head socket at said side of the member and bolts engaged with the screw seats of the one member and having heads seated in the sockets provided for the same in the other member.

2. A cable tap comprising cooperating clamp members having opposed cable receiving recesses, one of said members having screw seats at opposite sides of the recess therein, the other member having bolt head receiving sockets at opposite sides of the recess therein, said latter member having a conductor receiving socket therein between the bolt head sockets, said conductor receiving socket having an opening through one side of the same extending out through the side of said member beneath the bolt head socket at said side of the member and bolts engaged with the screw seats of the one member and having heads seated in the sockets provided for the same in the other member, the opening from the conductor receiving passage extending on an incline with respect to the axis of the bolt adjacent thereto.

3. A cable tap comprising companion cable clamping members having opposed cable receiving recesses, securing bolts connecting said members at opposite sides of said recesses, said members being open at the sides of the tap to expose the intermediate shank portions of said bolts and one of said members having a conductor receiving passage cut through to the bolt exposing open side of the member.

4. A cable tap comprising cooperating clamp members having opposed cable receiving recesses, one of said members having screw seats at opposite sides of the recess therein, the other member having bolt receiving openings at opposite sides of the recess therein in line with the screw seats in the first clamp member, the second clamp member having a conductor receiving socket therein between the bolt openings, said conductor receiving socket having an opening through one side of the same extending out through the side of said member beneath the bolt opening at said side of the member and bolts in said openings of the second member and engaged with the screw seats of the first member and whereby by separate adjustments of said bolts, both cable and conductor may be clamped or the tap may be set up on a cable preliminary to clamping a conductor by the second clamp member.

5. A cable tap comprising cooperating clamp members having opposed cable receiving recesses, one of said members having screw seats at opposite sides of the recesses therein, the other member having bolt receiving openings at opposite sides of the recess therein in line with the screw seats in the first clamp member, the second clamp member having a conductor receiving socket therein between the bolt openings, said conductor receiving socket having an opening through one side of the same extending out through the side of said member beneath the bolt opening at said side of the member and bolts in said openings of the second member and engaged with the screw seats of the first member and whereby by separate adjustments of said bolts, both cable and conductor may be clamped or the tap may be set up on a cable preliminary to clamping a conductor by the second clamp member and the opening from the conductor receiving passage extending on an incline with respect to the axis of the bolt adjacent thereto to enable a wrapping engagement of the second clamp member about a conductor by the tightening of said bolt.

6. A cable tap comprising cooperating clamp members having opposed cable receiving recesses, one of said members having screw threaded seats at opposite sides of the recess therein, the other member having bolt receiving openings at opposite sides of the recess therein in line with the screw threaded seats of the first mentioned clamp member, separate screw bolts in said openings in the one member and screwed into engagement with the screw threaded seats of the other clamp member, one of said clamp members having a conductor receiving socket therein between said bolts and said socket having an opening through one side of the same extending out through the side of said member, enabling the bolt at that side to be tightened to close the conductor receiving socket on a conductor therein independently of the other bolt holding the two clamp members together.

MICHAEL J. CAFIERO.